US011436590B2

(12) United States Patent
Senguttuvan et al.

(10) Patent No.: US 11,436,590 B2
(45) Date of Patent: Sep. 6, 2022

(54) ELECTRONIC TRANSACTION FOBS

(71) Applicant: PayPal, Inc., San Jose, CA (US)

(72) Inventors: Guhan Senguttuvan, San Jose, CA (US); Satish Narayan Govindarajan, Los Altos, CA (US); Anantharaj Uruthiralingam, Santa Clara, CA (US); Carlos Manuel Rivas, Redwood City, CA (US); Gordon Lo, San Jose, CA (US); Jeffrey Hirsch, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 781 days.

(21) Appl. No.: 15/854,671

(22) Filed: Dec. 26, 2017

(65) Prior Publication Data

US 2019/0197517 A1 Jun. 27, 2019

(51) Int. Cl.
*G06Q 40/00* (2012.01)
*G06Q 20/32* (2012.01)
*G06K 19/07* (2006.01)
*G06K 19/077* (2006.01)

(52) U.S. Cl.
CPC ..... *G06Q 20/3278* (2013.01); *G06K 19/0718* (2013.01); *G06K 19/0719* (2013.01); *G06K 19/0723* (2013.01); *G06K 19/07707* (2013.01); *G06K 19/07728* (2013.01)

(58) Field of Classification Search
CPC ............ G06Q 20/3278; G07C 9/00944; G07C 9/00563; G06F 21/32; G06F 21/35
See application file for complete search history.

(56) References Cited

U.S. PATENT DOCUMENTS

| | | | | |
|---|---|---|---|---|
| 9,519,901 B1* | 12/2016 | Dorogusker | .......... | G06Q 20/322 |
| 10,567,381 B1* | 2/2020 | Baer | ....................... | H04L 63/10 |
| 2004/0233038 A1* | 11/2004 | Beenau | ................... | G07F 7/025 |
| | | | | 340/5.83 |
| 2004/0236701 A1* | 11/2004 | Beenau | .............. | G06K 19/0723 |
| | | | | 705/64 |
| 2006/0220806 A1* | 10/2006 | Nguyen | ................ | B60R 25/102 |
| | | | | 340/426.36 |
| 2010/0052931 A1* | 3/2010 | Kolpasky | ................ | B60R 25/00 |
| | | | | 340/670 |

(Continued)

OTHER PUBLICATIONS

Lott, David (Improving Customer Authentication, Retail Payments Risk Forum Working Paper Federal Reserve Bank of Atlanta, Apr. 2015) (Year: 2015).*

(Continued)

*Primary Examiner* — Elizabeth H Rosen
*Assistant Examiner* — Mark H Gaw
(74) *Attorney, Agent, or Firm* — Haynes and Boone, LLP

(57) ABSTRACT

Systems and methods for electronic fobs that communicate via short range communications protocols to conduct transactions with a nearby device are provided. Such electronic fobs may use electronic tokens to conduct electronic transactions, such as payment transactions. Account data may be stored within a secure element of the electronic fob. Electronic tokens may also be stored by the secure element. Using such data and/or tokens, electronic fob may write electronic tokens to be used in electronic transactions. Also, such electronic fobs may also be used to perform other tasks and interface with other devices.

20 Claims, 8 Drawing Sheets

(56) References Cited

U.S. PATENT DOCUMENTS

| | | | | |
|---|---|---|---|---|
| 2011/0101093 A1* | 5/2011 | Ehrensvard | G06Q 20/12 | 235/380 |
| 2012/0290417 A1* | 11/2012 | Luevane | G07G 1/12 | 705/16 |
| 2014/0043138 A1* | 2/2014 | Idsoe | G07C 9/00944 | 340/5.53 |
| 2015/0066758 A1* | 3/2015 | DeNardis | G06Q 20/352 | 705/41 |
| 2015/0145648 A1* | 5/2015 | Winkelman | G07C 9/00571 | 340/5.72 |
| 2016/0285871 A1* | 9/2016 | Chathoth | H04L 63/0807 | |
| 2017/0249628 A1* | 8/2017 | Douglas | G07F 7/084 | |
| 2019/0026483 A1* | 1/2019 | Boireau | G06F 21/35 | |
| 2019/0114645 A1* | 4/2019 | Gaitanos | G06Q 20/4012 | |

OTHER PUBLICATIONS

Exxon and Mobil, "Contactless Gas Payment System", Sep. 29, 2017, 2 pages [online], [retrieved on May 2, 2018], Retrieved from the Internet: <URL:https://web.archive.org/web/20170929082915/https://www.exxon.com/en/speedpass>.

* cited by examiner

ELECTRONIC TRANSACTION FOBS

BACKGROUND

Field of the Invention

The present invention generally relates to electronic devices, and more particularly to fobs used for electronic transactions.

Related Art

Electronic devices are increasingly used to conduct transactions, such as communicating data or transferring electronic funds. Such electronic transactions are often conducted with conventional computers or smartphones. However, electronic transactions using such conventional computers or smartphones may be inconvenient as they may require a user to scroll through multiple screens before the transaction can be completed. Additionally, transactions using such conventional computers or smartphones may be optimized for remote transactions between parties at different locations. Thus, transactions between two parties that are face to face would still require the user to go through the same process as conducting a remote transaction. Accordingly, there is a need to improve in-person electronic transactions using mobile computing devices.

Figure 1:
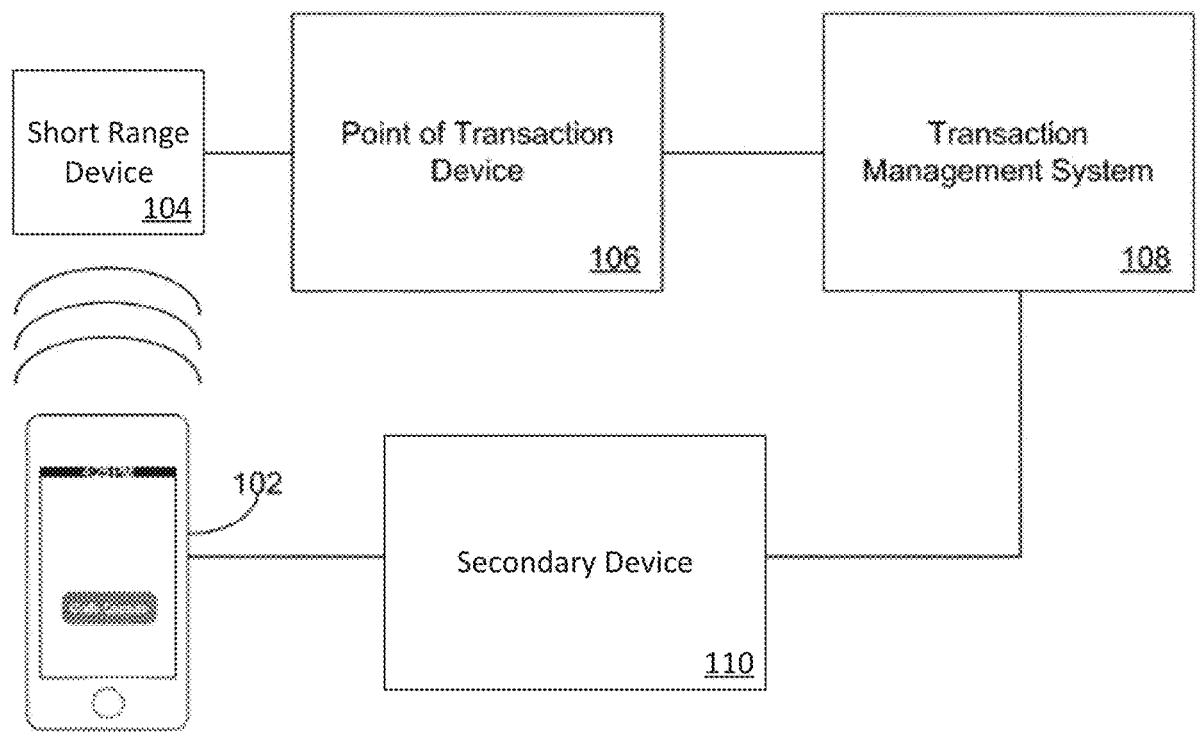
FIG. 1 is a block diagram showing a system according to an embodiment of the disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that allow electronic fobs to communicate via short range communications protocols to conduct transactions with a nearby device. The electronic fobs may be associated with a secondary computing device (e.g., smartphone or computer) and may be activated when communicatively connected to the computing secondary device. Once activated, the electronic fob may receive tokens for use in conducting the transactions. In certain embodiments, after activation, the electronic fob is no longer required to communicate with the secondary computing device. In certain such embodiments, the electronic fob may only need to communicate with transaction devices associated with merchants that the electronic fob is conducting the transaction with. In such embodiments, the electronic fob does not directly communicate with transaction service provider devices.

Electronic tokens may be used to conduct electronic transactions, such as payment or funding transactions between users or between a user and a merchant. In certain embodiments, electronic data may be received and stored within a secure element of the electronic fob. Additionally, electronic tokens may be on-boarded to the electronic fob when the electronic fob is communicatively connected to the secondary computing device. In other embodiments, the electronic fob may write new tokens using information stored within the secure element.

FIG. 1 is a block diagram showing a system according to an embodiment of the disclosure. As shown, an account holder or user may have or use an electronic fob 102. The electronic fob 102 has a display and an input device (e.g., an input button or scroll buttons) as well as an authentication sensor (e.g., a biometric sensor such as a fingerprint sensor, a voice sensor, an accelerometer, or other type of sensor). Pursuant to embodiments of the present invention, the user may utilize the electronic fob 102 to conduct a transaction with a merchant or other entity via a point of transaction device 106 through a short range communications protocol.

Pursuant to some embodiments, such a short range communications protocol may be, for example, Near Field Communications (NFC) or Zigbee. Other examples of such communications protocols may include Bluetooth protocols (including Bluetooth Low Energy), infrared communications, as well as various WiFi based protocols. The electronic fob 102 may include hardware for communicating using the short range communications protocol, such as, for NFC communications, a radio frequency identification ("RFID") chip installed therein. More particularly, pursuant to some embodiments, the electronic fob 102 may include a secure element to write or create electronic tokens to be used in transactions.

The point of transaction device 106 may be, for example, a point of sale terminal, an automated teller machine, another mobile device (e.g., such as a portable point of sale terminal, another individual's mobile device, etc.), or the like. The point of transaction device 106 may be configured to communicate with the electronic fob 102 via the short range communications protocol through short range device 104. The short range device 104 may be configured to receive tokens and other communications from electronic fob 102 and communicate such tokens or data to point of transaction device 106. Electronic tokens used may be dynamically generated for use in individual transactions or may be cached and stored for use within electronic fob 102, such as within a secure element or memory.

In some embodiments, after the transaction device 106 has received the electronic token from the electronic fob 102, the transaction device transmits data to a transaction management system 108 for use in completing a transaction. Pursuant to some embodiments, data associated with the checkout token may be used in conjunction with identifying or selecting an appropriate account for the transaction, for associating the electronic fob 102 (or its user) with a transaction, or for otherwise obtaining information about a pending transaction with a point of transaction device 106.

Thus, for example, electronic fob 102 may provide payment or funding source data to merchant device 106 by transmitting an electronic token to short range device 104. Short range device 104 may then provide the token to the merchant device 106. Merchant device 106 may then provide the token or details of the token to transaction management system 108. Transaction management system 108 may include a database containing data associated with an account associated with the user of electronic fob 102. The data received by transaction management system 108 (e.g., data identifying the account, the user, the merchant, the amount, the payment time, etc.) may be used to confirm that the transaction is proper by, for example, matching account details of the electronic token with details stored by the database of transaction management system 108. The transaction management system 108 then provides payment (e.g., to the merchant) and updates the account of the user (e.g., by deducting the amount paid, by noting the transaction, and/or by providing for any reward points for the payment account). While some embodiments have electronic fobs 102 that do not communicate directly with transaction management system 108, other embodiments of the electronic fobs 102 may directly communicate with transaction management system 108 (e.g., through a WiFi, 3G, 4G, and/or other connection).

Secondary device 110 may be a further electronic device such as a smartphone, a computer, a tablet, or another such device. Electronic fob 102 may couple to secondary device 110 to, for example, activate electronic fob 102 (e.g., initial setup), receive tokens for use in conducting the transactions, or verify operation of electronic fob 102. Electronic fob 102 may be required to periodically connect to secondary device 110 to, for example, authenticate the user and confirm that electronic fob 102 has not been lost or stolen. Additionally, electronic fob 102 may periodically connect or reconnect to the secondary device to refresh or obtain additional electronic tokens (e.g., electronic fob 102 may connect to the secondary device when electronic tokens are exhausted or are lower than a threshold amount).

Figure 2:
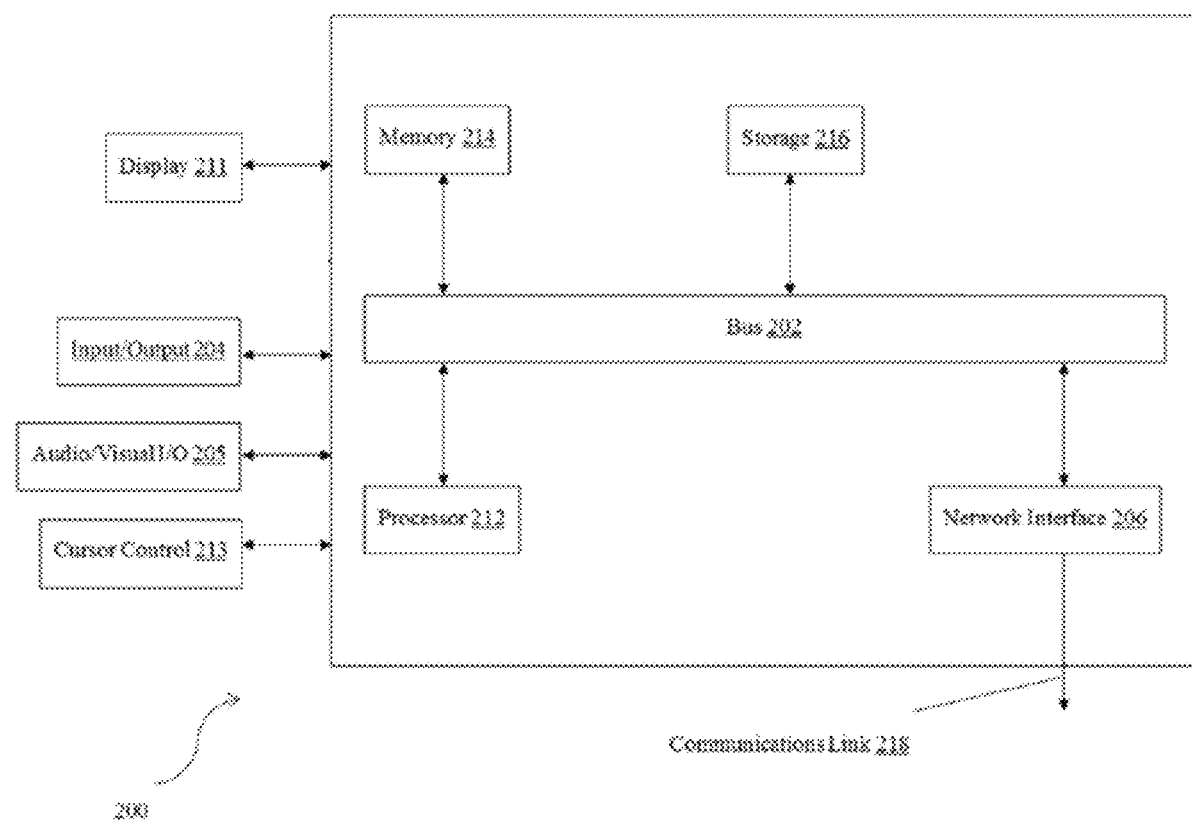
FIG. 2 is a block diagram showing an electronic device according to an embodiment of the disclosure.

FIG. 2 is a block diagram showing an electronic device according to an embodiment of the disclosure. In various embodiments, electronic device 200 of FIG. 2 may be an electronic fob (e.g., a small handheld device of, for example, no more than 4 inches in length) capable of communicating with a short range communications protocol, as discussed herein. In certain examples, the electronic fob is smaller in form factor than, for example, a cellphone or smartphone. While certain electronic fobs may not communicate via pre-established communications networks (e.g., data connections such as existing 4G or other cellphone networks), other electronic fobs may communicate over the pre-established communications networks. It should be appreciated that each of the devices utilized by users and service providers may be implemented as electronic device 200 in a manner as follows.

Electronic device 200 includes a bus 202 or other communication mechanism for communicating data, signals, and information between various components of electronic device 200. Components include an input/output (I/O) component 204 that may be used to receive inputs and/or instructions from users and provide outputs to confirm such inputs and/or instructions (e.g., through haptic feedback or noises). I/O component 204, which may be comprised of multiple devices, may also include an output component, such as a display 211 and a cursor control 213 (such as a keyboard, keypad, mouse, etc.). Electronic device 200 may also include an optional audio input/output component 205 to allow a user to use voice for inputting information by converting audio signals. Such an audio I/O component 205 may also output audio information.

A transceiver or network interface 206 transmits and receives signals between electronic device 200 and other devices, such as another electronic device, short range device, server device, or a merchant device. In one embodiment, the transmission is wireless and of a limited range (e.g., the range of short range communications may be approximately two feet or less), although other transmission mediums and methods may also be suitable. One or more processors 212, which may be a micro-controller, digital signal processor (DSP), or other processing component, processes these various signals and may provide instructions for an ensuing action, such as displaying information on display 211 of electronic device 200 or transmission of the information to other devices via a communication link 218. Processor(s) 212 may also control transmission of information as well as links to other devices such as through, for example, longer ranged communications (e.g., Bluetooth® connections).

Components of electronic device 200 may also include a system memory component 214 (e.g., RAM) and/or a static storage component 216 (e.g., ROM). Electronic device 200 performs specific operations by processor(s) 212 and other components by executing one or more sequences of instructions contained in system memory component 214 and/or a static storage component 216. Logic may be encoded in a computer readable medium, which may refer to any medium that participates in providing instructions to processor(s) 212 for execution. Such a medium may take many forms, including but not limited to, non-volatile media, volatile media, and transmission media. In one embodiment, the logic is encoded in non-transitory computer readable medium.

Figure 3A:
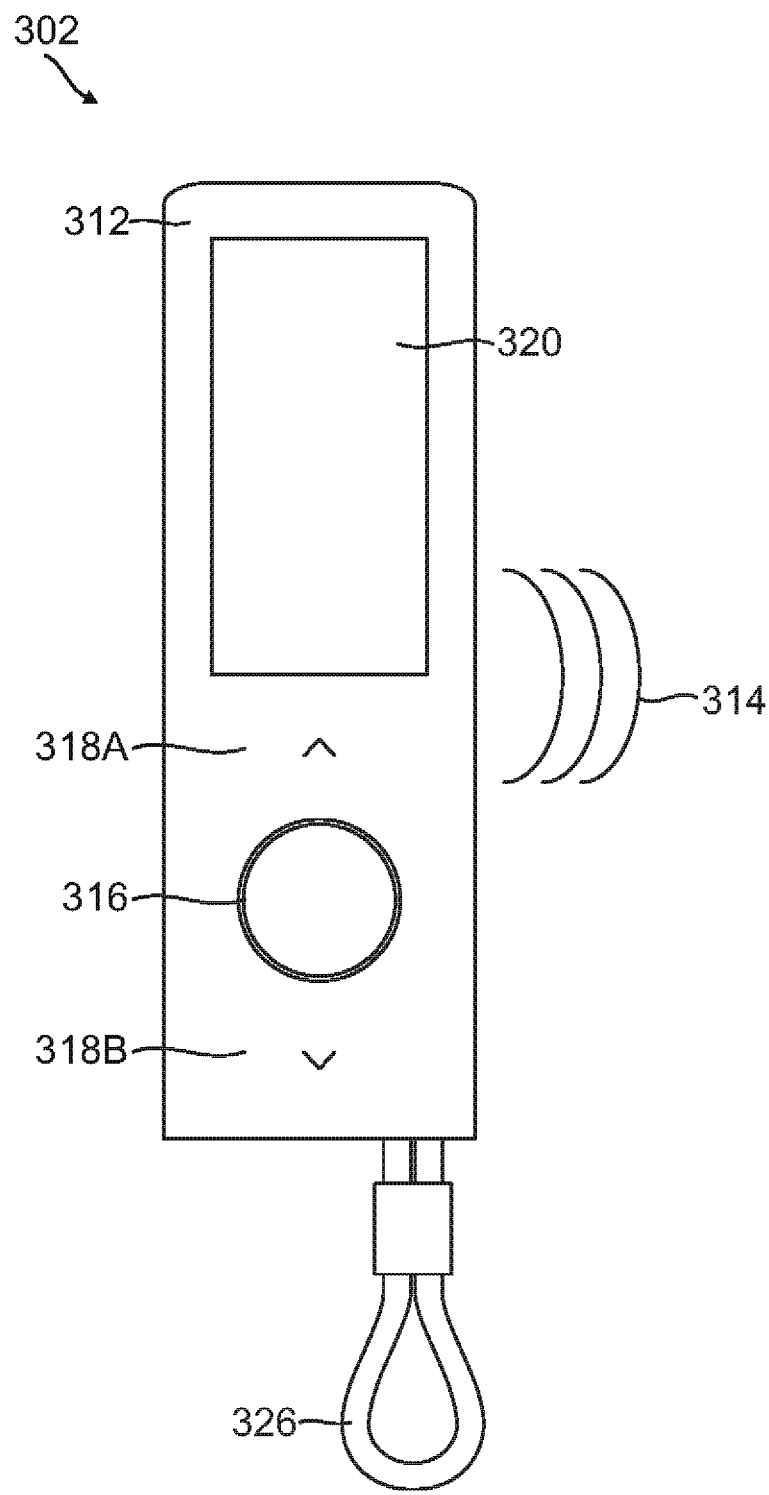
FIGS. 3A and 3B are views of an example electronic transaction fob according to an embodiment of the disclosure.
Figure 3B:
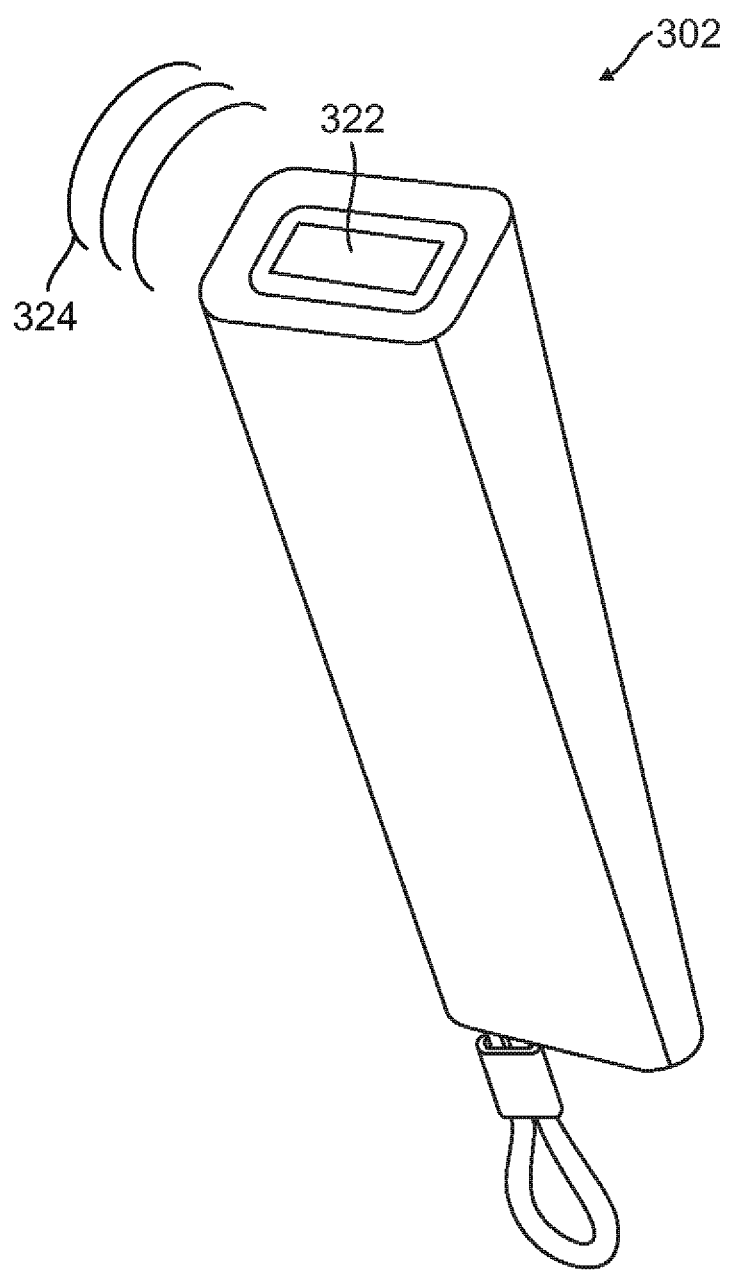

FIGS. 3A and 3B are views of an example electronic transaction fob according to an embodiment of the disclosure. FIGS. 3A and 3B illustrate an electronic fob 302. Electronic fob 300 includes a device body 312. The device body 312 includes an input button 316, scrolling buttons 318A and 318B, a display 320, an authentication sensor 322, and an attachment mechanism 326. Additionally, electronic fob 302 may be configured to communicate via short range communications 314 and via intermediate range communications 324.

Device body 312 may be an oblong body, symmetrical, rectangular, circular, oval, pentagonal, triangular, or other geometrically shaped. Device body 312 may include a plurality of surfaces. For example, as shown in FIGS. 3A and 3B, display 320, input button 316, and scrolling buttons 318A and 318B are disposed on a first surface of device body 312 while authentication sensor 322 is disposed on a second surface of device body 312. Other embodiments may dispose components on other surfaces of device body 312. For example, in a certain embodiment, a display may disposed on a first surface while scrolling buttons may be disposed on a second surface and the authentication sensor may be disposed on a third surface. Other embodiments may arrange various components of the electronic fob in other configurations. Thus, in various embodiments, display 320, input button 316, and scrolling buttons 318A and 318B, and authentication sensor 322 may all be disposed on a single surface or one or more of display 320, input button 316, and scrolling buttons 318A and 318B, and authentication sensor 322 may be disposed on surfaces different from each other.

Input button 316 and scrolling buttons 318A and 318B may be configured to receive user inputs. For example, scrolling buttons 318A and 318B may be configured to allow a user to scroll through one or more screens shown on display 320 and/or scroll through a plurality of possible selections (e.g., a plurality of menus, a plurality of possible payment amounts, and/or confirmations or cancellations). In other embodiments, display 320 may be a touchscreen. The user may scroll through those selections by pressing one of scrolling buttons 318A and 318B to scroll upwards and downwards, respectively, for those selections. The user may also select an amount of payment by pressing scrolling buttons 318A or 318B to increase or decrease, respectively, the amount to be provided in a payment.

A selection may then be made by pressing input button 316. In certain embodiments, input button 316 may be configured for a plurality of possible uses. Thus, input button 316 may be pressed in a plurality of ways. For example, pressing the top of input button 316 may allow for confirmation of the selection, while pressing the bottom of input button 316 may allow for rejection of the selection. In certain additional embodiments, input button 316 and scrolling buttons 318A and 318B may be combined into a single button. As such, pressing the top or bottom of the input button may allow a user to scroll upward or downward, respectively, while pressing a left side of the input button may allow for a user to confirm a selection and pressing a right side of the input button may allow for a user to reject a selection.

Display 320 may be configured to display one or more menus, including menus allowing for a user to confirm an identity of a user or select a user from a plurality of users, to confirm a recipient, to select an account or funding source to be used in a transaction (e.g., from a plurality of accounts or funding sources), to select an amount to be provided in a payment, and/or other such selection. Display 320 may be, for example, a LCD, LED, or other type of display.

Authentication sensor 322 may aid in authenticating a user of the electronic fob 302. Authentication sensor 322 may be one or more of a biometric sensor such as a fingerprint sensor, a body odor sensor, a heart rate sensor, another type of biometric sensor, an accelerometer, a pedometer, an audio sensor, and/or another such sensor that may detect user characteristics or environmental characteristics. For example, a biometric sensor may detect one or more biometric characteristic of the user and match the biometric characteristic with stored biometric data associated with the user. If the detected biometric characteristic matches the stored biometric data within a margin, then the user may be authenticated. In another example, an audio sensor may detect a user's voice and, if there a sufficient match between the detected voice and stored data of a user's voice, the user may be authenticated. Additionally, how a user holds or moves with electronic fob 302 may be detected by an accelerometer or pedometer (e.g., if a user swings electronic fob 302 when walking or moves at a certain pace) and may be matched with stored data to authenticate the user.

In certain such embodiments, the authentication sensor 322 may be used to gather the user's biometric data for future authentication use. Thus, a fingerprint sensor may initially detect a user's fingerprint and such fingerprints may be used in the future to authenticate the user (e.g., an initial activation process of electronic fob 302 or initial setup of a new user may request the user to place his finger on the fingerprint sensor one or more times to detect and store the fingerprint of the user). Additionally, such a process may detect the user's voice, body odor, heart rate, or other biometric data. Furthermore, an accelerometer of electronic fob 302 may store motion indicative of user possession of electronic fob 302 over a period of time. Electronic fob 302 may store motion data related to such movement and may then use such data to authenticate the user.

Electronic fob 302 may be enabled or configured to conduct short range communications 314 and intermediate range communications 324. Short range communications 314 may be enabled through communications circuitry configured to communicate with electronic devices within a short distance (e.g., less than 2 feet) of electronic fob 302, which are known in the art. Short range communications 314 may be used to, for example, communicate electronic tokens for payment. Such a token may be written or generated by a secure element of electronic fob 302. Short range communications 314 may communicate through communications protocols such as NFC, Zigbee, Bluetooth protocols (including Bluetooth Low Energy), infrared communications, as well as various WiFi based protocols.

Intermediate range communications 324 may be enabled through communications circuitry configured to communicate with electronic devices within an intermediate distance (e.g., less than 200 feet) of electronic fob 200, which are known in the art. Intermediate range communications 324 may be used to, for example, couple electronic fob 200 to a secondary device (e.g., for setup). Intermediate range communications 324 may communicate through communications protocols such as Zigbee, Bluetooth protocols (including Bluetooth Low Energy), infrared communications, as well as various WiFi based protocols.

Attachment mechanism 326 may allow for electronic fob 302 to be attached to another object. For example, attachment mechanism 326 may be a lanyard that allows for electronic fob 302 to hang off of a user's helmet, attach to a keychain, or otherwise couple or help a user hold electronic fob 302.

Figure 3C:
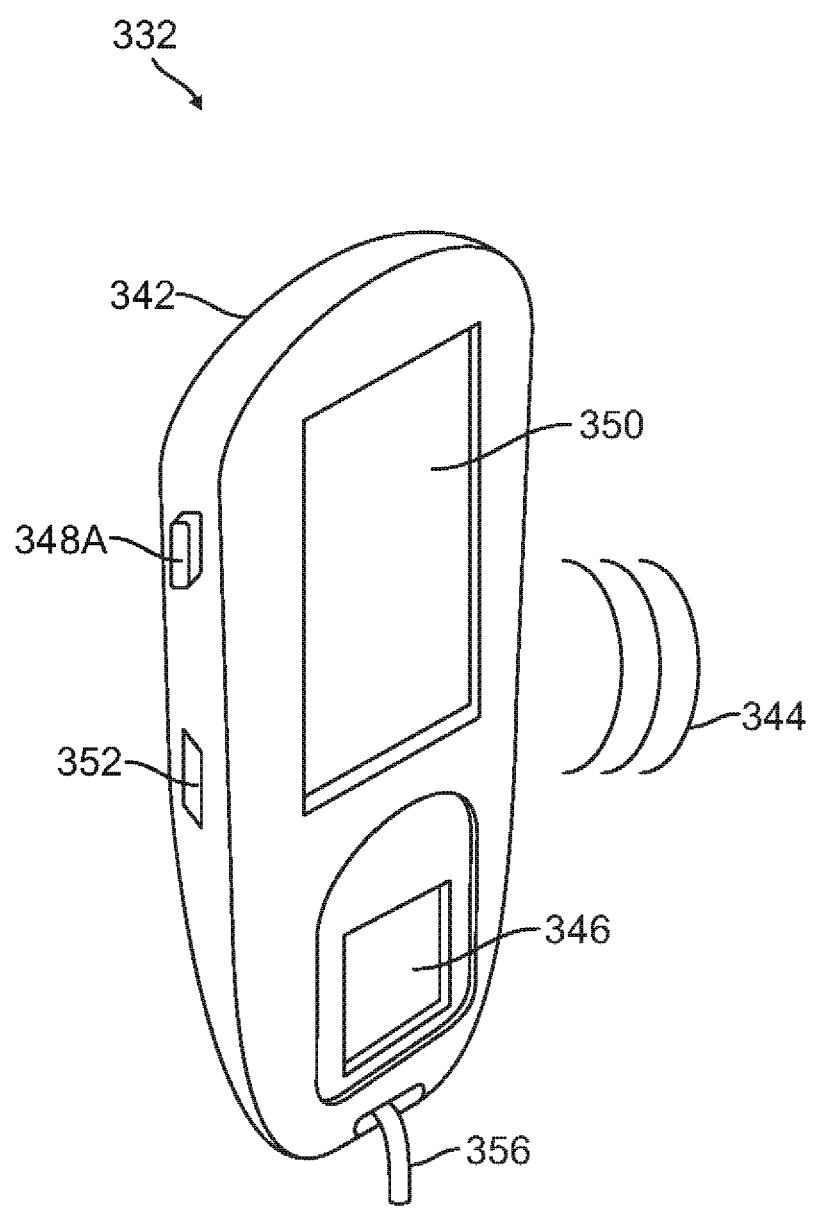
FIGS. 3C and 3D are views of another example electronic transaction fob according to an embodiment of the disclosure.
Figure 3D:
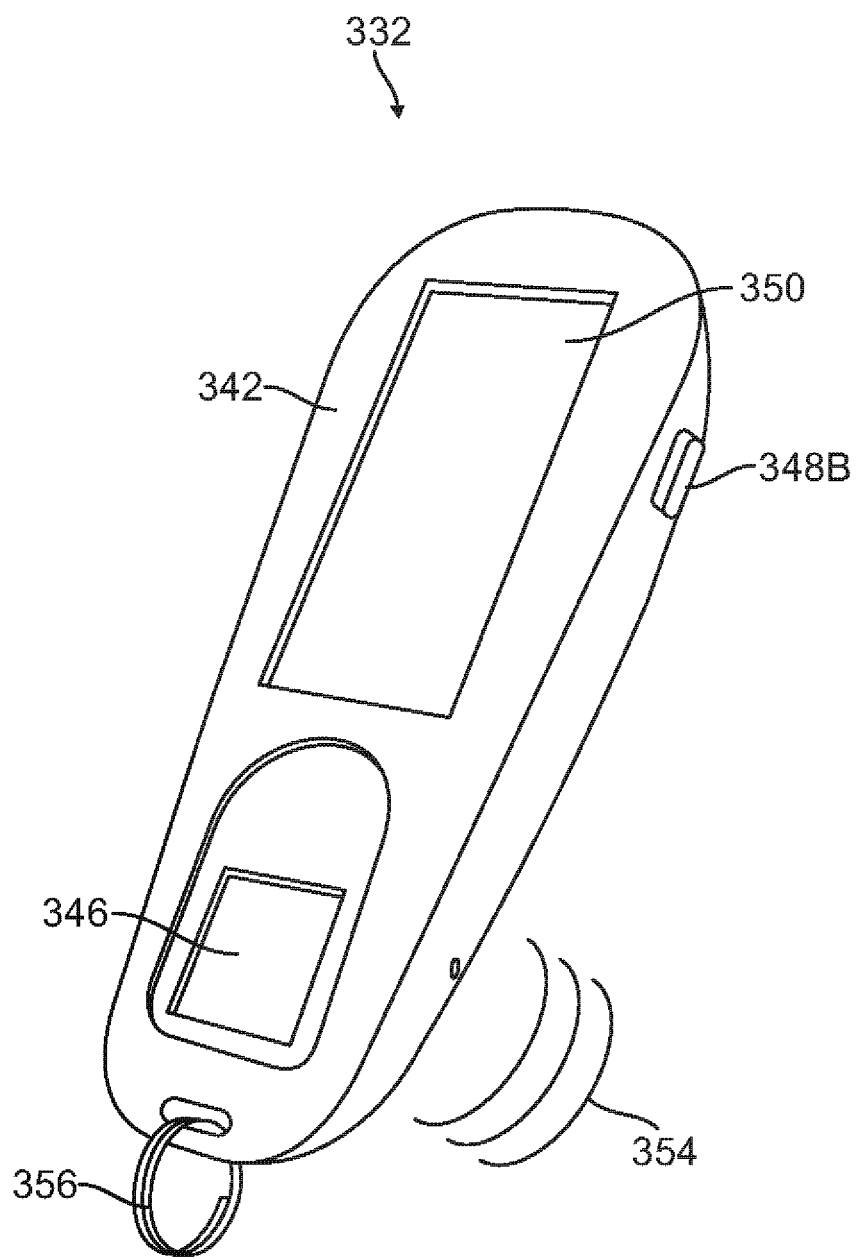

FIGS. 3C and 3D are views of another example electronic payment fob according to an embodiment of the disclosure. FIGS. 3C and 3D illustrate an electronic fob 332. Electronic fob 332 includes a device body 342. The device body 342 includes an input button 346, scrolling buttons 348A and 348B, a display 350, an authentication sensor 352, and an attachment mechanism 356. Additionally, electronic fob 332 may be configured to communicate via short range communications 344 and via intermediate range communications 354.

Electronic fob 332 is a different configuration of an electronic fob than electronic fob 302 shown in FIGS. 3A and 3B. One difference is the positioning of certain components of electronic fob 332. For example, while display 350 and input button 346 are disposed on a front surface of device body 342, scrolling buttons 348A and 348B are disposed on a second surface and a third surface, respectively, that are different from the first surface of device body 342. Scrolling buttons 348A and 348B are on the sides of device body 342 and, thus, a user can use scrolling buttons 348A and 348B by holding device body 342 from the back. Also, while authentication sensor 322 of FIGS. 3A and 3B may be a fingerprint sensor, authentication sensor 352 may be an audio sensor. Also, attachment mechanism 326 of FIGS. 3A and 3B is a lanyard while attachment mechanism 356 of FIGS. 3C and 3D is a key ring.

Figure 3E:
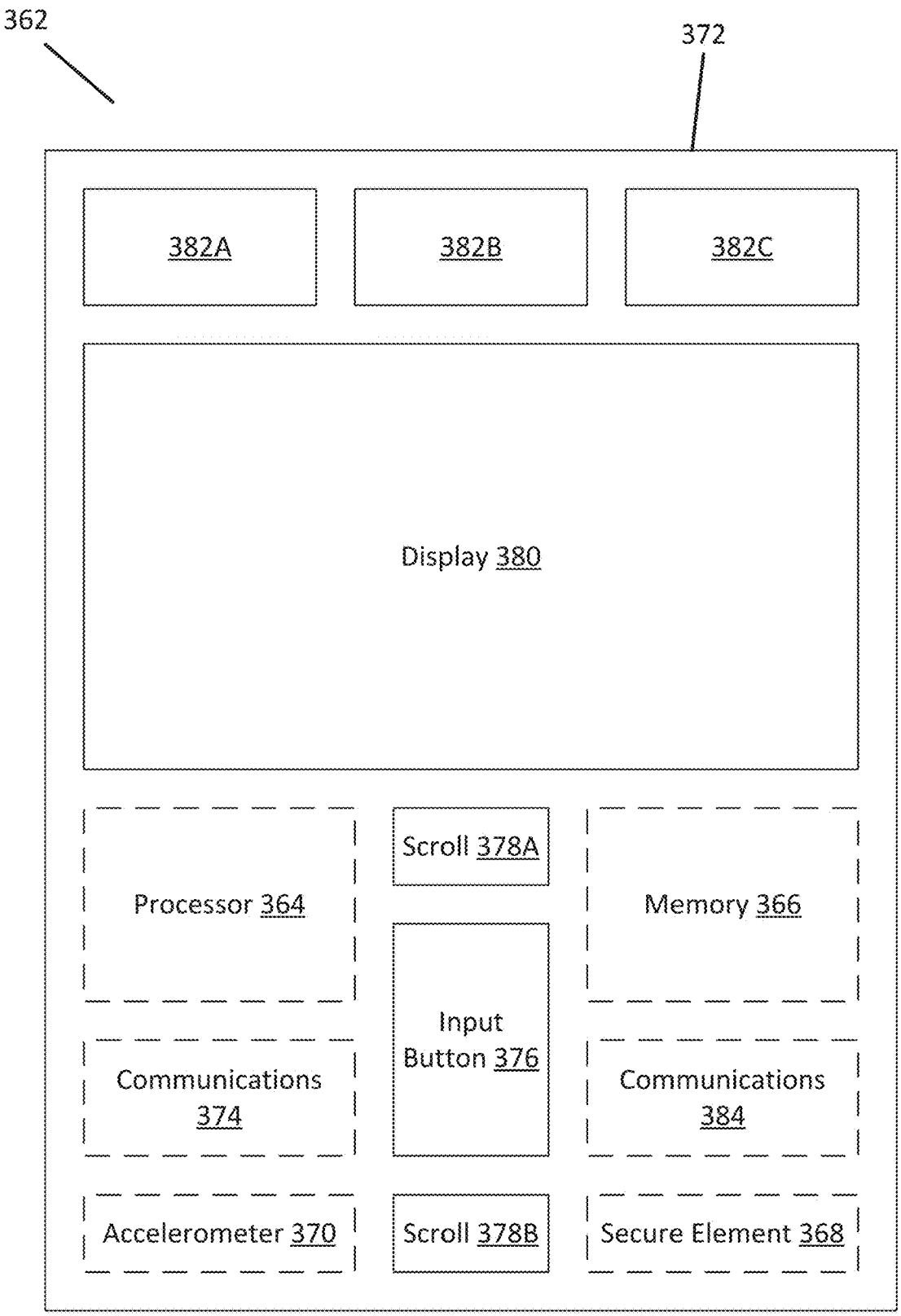
FIG. 3E is a block diagram of an example electronic transaction fob according to an embodiment of the disclosure.

FIG. 3E is a block diagram of an example electronic payment fob according to an embodiment of the disclosure. FIG. 3E illustrates an electronic fob 362. Electronic fob 362 includes a device body 372. The device body 372 includes an input button 376, scrolling buttons 378A and 378B, a display 380, and authentication sensors 382A-C. Additionally, electronic fob 362 may also include processor 364, memory 366, secure element 368, accelerometer 370, short range communications circuitry 374, and intermediate range communications circuitry 384.

Device body 372 may be any type of body configured to contain, hold, or mount components of electronic fob 362. Device body 372 may be a small form factor body (e.g., each major dimension of device body 372 may be less than 4 inches) and may include one or more components. Such components may be coupled together to collectively constitute device body 372. Device body 372 may be made from composites, plastics, metals, glass, and/or other material or combination thereof. Input button 376, scrolling buttons 378A and 378B, display 380, and authentication sensors 382A-C may be positioned on any portion of device body 372 (e.g., one or more surfaces of device body 372).

Electronic fob 362 may include a plurality of authentication sensors 382A-C. While three authentication sensors are shown in FIG. 3E, other embodiments may include any number of authentication sensors. Authentication sensors 382A-C may include a fingerprint sensor, an audio sensor, a heartrate sensor, a facial recognition camera (e.g., for detecting and matching user facial features), an odor sensor (e.g., for detecting and matching user body odor), and/or other such type of sensor. Additionally, accelerometer 370 may be used to detect forces exerted on electronic fob 362 (e.g., whether electronic fob 362 swings when being carried, how a user places electronic fob 362 when using electronic fob 362 for payment, and/or another such movement) and match such forces or movement with pre-stored data indicating how a user utilizes electronic fob 362. For example, a user may generally keep electronic fob 362 in a pocket and pull out electronic fob 362 with a certain movement. Forces or movement indicative of storage within a pocket (e.g., very small magnitude of motion when stored) and indicative of the motion of the user when pulling out electronic fob 362 may be stored and matched to authenticate the user.

In certain embodiments, electronic fob 362 may include a plurality of users and/or a plurality of functions (e.g., payment through a user payment account, payment through a credit card account, and/or unlocking doors of the user's). In such embodiments, authentication required for various functions may differ. For example, providing payment through a user payment account at a low limit may only require the user to provide an authentication sequence (e.g., a series of presses of the button), while unlocking doors may require a user to confirm his or her fingerprint.

In certain other embodiments, electronic fob 362 may be associated with one or more group accounts. Such group accounts may be, for example, a group or corporate payment account. Such group accounts may include a plurality of account holders. In certain embodiments, one, some, or all of the account holders may need to be authenticated in order for the group account to be used in a transaction with electronic fob 362. For example, the fingerprints of all of the account holders may be required. In other situations, authentication may be tiered. In one example, electronic fob 362 may be configured to store and receive PIN combinations. If a PIN is used for authentication, the PIN of all accounts holders may need to be correctly inputted for the group account to be used. Alternatively, if any one of the group member's fingerprints is provided, the group account may be used. In such a situation, fingerprints are considered to be a higher form of authentication.

Alternatively, one or more of authentication sensors 382A-C may be another device or component. As such, 382C may instead be a haptic feedback motor configured to provide haptic feedback to a user (e.g., confirmation of a transaction may result in a quick vibration of electronic fob 362 while rejection of a transaction may result in a long vibration of electronic fob 362).

Additionally, 382B may be a tracking component. Such a tracking component may be, for example, a global positioning device that allows for positions of electronic fob 362 to be tracked. Thus, if electronic fob 362 is moved to a suspicious location (e.g., a location known to be associated with fraudulent transactions or a location where the user has not conducted a transaction in the past), electronic fob 362 may be disabled. In certain such embodiments, the user may designate areas that electronic fob 362 may be used within. Moving the electronic fob 362 out of such locations may render electronic fob 362 temporarily or permanently inoperable. In other situations, the location of electronic fob 362 and the transactions may be tracked and if both indicate a suspicious transaction, the transaction may be rejected and electronic fob 362 may be temporarily or permanently disabled. In another embodiment, the user may be required to provide higher or additional authentications, e.g., not just a PIN, but also a fingerprint.

In certain embodiments, accelerometer 370 or a pressure or touch sensor may also be used to detect forces exerted on electronic fob 362 to conduct payment transactions. For example, certain embodiments of electronic fob 362 may process transactions according to forces exerted on electronic fob 362. Thus, to wake up electronic fob 362, the user may tap electronic fob 362 once. Then, to load a screen to provide details of a payment transaction, the user may tap the electronic fob 362 twice. The user may then use scrolling buttons 378A and 378B to select a payment amount, which may be shown on display 380. When the correct amount is shown, the user may again tap electronic fob 362 twice to conduct the payment transaction. Otherwise, if the user wishes to cancel the transaction, the user may wave electronic fob 362 back and forth three times. Electronic fob 362 may then cancel the transaction and, in order to conduct another transaction, the user may be required to tap electronic fob 362 once. Other embodiments may require users to tap, wave, or move electronic fob 362 for another amount of times or through other actions.

Furthermore, such motions may be customizable to the user. Thus, the user may specify which action(s) is/are used to determine whether to unlock, input payment, confirm payment, provide payment, and/or perform any other actions described herein. As such actions are customizable, unique accelerometer detected movements to control electronic fob 362 may be a further form of authentication.

Processor 364 and memory 366 may be similar to processors and memories described herein. In certain embodiments, secure element 368 may write electronic tokens for use with payment transactions. For example, secure element 368 may create a new electronic token or write onto an existing stored electronic token details associated with the user, the user payment account, the payment amount, the time of transaction, the merchant or payee identity, the purpose of the transaction (e.g., payment for goods or services rendered), items or other parties associated with the payment, additional agreements (e.g., reward points), or other details of the transaction. Secure element 368 may store details of the user and/or any user payment accounts associated with electronic fob 362 and such details may be used to conduct payment transactions (e.g., written onto the electronic token). In certain embodiments, the user may be authenticated or a user payment account may be verified or validated when electronic fob 362 is communicatively coupled (e.g., via short or intermediate range communications protocols for short range communications circuitry 374 or intermediate range communications circuitry 384, respectively) to a secondary device (e.g., a smartphone or computer of the user). Once authenticated, verified, or validated, details of the user payment account may be provided to electronic fob 362 and stored within secure element 368. Such details may then be used to conduct transactions without electronic fob 362 directly connecting to servers of payment providers, thereby providing more security because sensitive information has less risk of being intercepted during a communication with a server.

One of more accounts associated with electronic fob 362 may include a plurality of payment limits. According, if the user is not authenticated, electronic fob 362 may be used to conduct payment transactions at a first limit. For example, if the user is not authenticated, electronic fob 362 may conduct transactions at a first individual transaction limit (e.g., $5 or another such lower limit) and electronic fob 362 may only be allowed to conduct transactions of a first total transaction limit (e.g., $25 or another such lower limit) within a time period (e.g., per day). If the user is authenticated, electronic fob 362 may conduct transactions at a second individual transaction limit (e.g., $500 or another such higher limit) and electronic fob 362 may be allowed to conduct transactions of a second total transaction limit (e.g., $2,500 or another such higher limit) within the time period (e.g., per day).

Other embodiments of electronic fob 362 may enable the user conduct payment transactions through accounts other than the user electronic account (e.g., PayPal® account). For example, electronic fob 362 may store data associated with one or more funding sources, such as credit cards, debit cards, reward points, and the like. The user may, when conducting a payment transaction, select whether to pay with the user electronic payment account or whether to pay with one or more of the stored funding sources. In certain such embodiments, the funding source may be associated with one or more user profiles of electronic fob 362 and may only be allowed to be used if the user is properly authenticated by electronic fob 362. Additionally, for credit or debit cards, the secure element may be configured to issue new card verification values (CVVs) for the card. For example, the secure element may create new CVVs when electronic fob 362 is connected to a secondary device or a merchant device that allows for electronic fob 362 to connect to the card issuer. Transactions using the cards may be conducted with electronic tokens and the CVVs may be written in the electronic tokens or may be directly communicated. Such new CVVs may decrease fraud by allowing for a new CVV to be provided whenever the card is used. Thus, CVVs may quickly become outdated and so stolen card numbers may quickly lose the ability to be used in fraudulent transactions.

Certain cards may be configured to be only associated with electronic fob 362. For such cards, the CVV may be a continuously changing code that varies from token to token. Any transaction device that requires payments with such cards may track which CVVs is next to be used or haven't been used yet. The merchant device may then confirm the received CVV of a payment transaction with the CVV that should next be used or haven't yet been used.

Electronic fob 362 may be configured to communicate with additional devices. For example, electronic fob 362 may communicate with electronic locks using short range communications circuitry 374. Electronic fob 362 may learn a code or sequence to unlock a RFID door lock. Thus, the user may then use electronic fob 362 to unlock the door lock by placing electronic fob 362 proximate (within communication range of) the door lock or performing one of more actions with electronic fob 362 (e.g., motions, confirmation of unlocking via the input button, or another such action) when electronic fob 362 is proximate the door lock.

Electronic fob 362 may also be configured to interface with other devices. In one embodiment, electronic fob 362, when placed within a short distance of a secondary device such as a smartphone or tablet (e.g., within 2 feet) may, when a specific action is performed, interface with the other device. For example, when electronic fob 362 is tapped against the secondary device, electronic fob 362 may detect the tap and a processor of electronic fob 362 may detect from short range communications circuitry 374 that electronic fob 362 is positioned next to the secondary device (e.g., from communications between short range communications circuitry of electronic fob 362 and the secondary device). Electronic fob 362 may then, in response to the tap, cause the secondary device to unlock or perform another such action (e.g., load the payment application on the secondary device of a payment provider). Such actions may increase user convenience by allowing interactions with an electronic fob 362 to perform actions that are normally multi-step on the secondary device.

Figure 4:
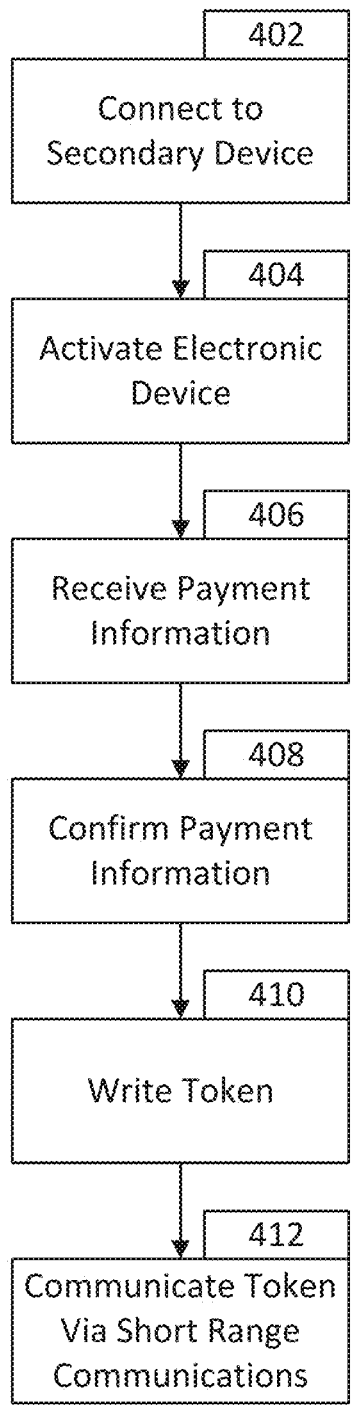
FIG. 4 is a flowchart showing an example of a transaction utilizing an electronic transaction fob according to an embodiment of the disclosure.

FIG. 4 is a flowchart showing an example of a transaction utilizing an electronic fob according to an embodiment of the disclosure. In block 402, the electronic fob may connect to a secondary device. The secondary device may authenticate the user and/or request that the user perform one or more setup operations.

In block 404, after the user has been authenticated and/or the electronic fob has been set up, the electronic fob may be activated. The electronic fob may then obtain electronic tokens for conducting transactions, obtain information for the secure element to create or write electronic tokens, receive authentication information for future authentication of the user, or receive other information or setup for operation of the electronic fob.

In block 406, transaction data, such as payment data, may be received by the electronic fob. In a certain example, the user may select or input the payment data (e.g., payment amount, recipient, and/or other such information) using buttons and/or other inputs of the electronic fob. In other embodiments, a merchant device or secondary device may provide the payment data. For example, a merchant device may show an amount to be paid. The user may then position the electronic fob within a short range (e.g., within communication distance) of the merchant device and tap the electronic fob one, two, or three or more times and/or perform another confirmation action (e.g., shake the electronic fob or press the input button to confirm payment when payment data is automatically provided to the electronic fob with the merchant device). Information for the amount and payee to be paid, as well as other data, may then be provided to the electronic fob.

In certain embodiments, a user of the electronic fob may then further confirm the information with the electronic fob in block 408. Such confirmation may be provided by pressing the input button when there is a confirmation screen and/or through one or more actions with the electronic fob.

In block 410, a token with the payment data may be written. A secure element of the electronic fob may write payment data to an existing token or write a new token. The token may then be communicated via the short range communications circuitry of the electronic fob. For example the electronic fob may communicate the token to a merchant device or a secondary device. In certain embodiments, the merchant device or the secondary device may then provide the token or data from the token to the user payment account's payment service (e.g., if a user is using a PayPal® service, the merchant device or the payment device may provide the token or token data to PayPal®). The payment service may then accordingly update the user's account. In certain embodiments, details (e.g., amount remaining) of the user's payment account may be stored on the electronic fob as well. The electronic fob may independently keep track of the user's account information (e.g., amount remaining). The electronic fob may periodically connect to a secondary device and update the user's account information.

As described herein, the electronic fob may be used in electronic transactions and may also be used for a variety of other functions, including payments. Various embodiments of the electronic fob may be used for any such functionality. The user may select which of the functions to use through, for example, selections using the scrolling buttons and/or the input buttons, direct physical interactions with the electronic fob (e.g., taps, shakes, swipes), or through other selection techniques (e.g., selecting through a secondary device).

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A fob comprising:
a body comprising a front surface and a top surface;
an input button disposed on the front surface of the body;
a plurality of scrolling buttons disposed on the front surface of the body;
a display disposed on the front surface of the body;
an authentication sensor disposed on the top surface of the body;
a secure element configured to store account data and a plurality of electronic tokens;
a non-transitory memory; and
one or more hardware processors coupled to the non-transitory memory and configured to read instructions from the non-transitory memory to cause the fob to perform operations comprising:
periodically reconnecting with a secondary device of a user;
refreshing, during the reconnecting, the plurality of electronic tokens with a service provider via the secondary device;
receiving, via the input button, an indication to conduct an electronic transaction with a merchant device using a user account of the user that is associated with the service provider, wherein the user account comprises a funding source utilizing a verification value for a use of the funding source with the electronic transaction;
determining a plurality of transactions limits associated with the use of the funding source with the electronic transaction using the fob based on a voice used during processing the electronic transaction;
determining that the use of the funding source with the electronic transaction requires an authentication using previously stored voice data of the user based on the plurality of transactions limits, wherein the previously stored voice data of the user is detected by the authentication sensor of the fob over a time period;
detecting the voice in a proximity to the fob using the authentication sensor;
authenticating the user for the fob using the voice, wherein the authenticating is based on comparing the voice to the previously stored voice data of the user;
determining an amount for the electronic transaction based on the plurality of transactions limits and the voice;
determining, via the secure element, an electronic token from the plurality of electronic tokens comprising transaction data based on the electronic transaction, the user account, and the amount;
generating the verification value from a plurality of verification values associated with the funding source;
writing the verification value to the electronic token; and
communicating, through a short range communications protocol, the electronic token to the merchant device independent of any communications to the service provider.

2. The fob of claim 1, wherein prior to the periodically reconnecting, the operations further comprise:
communicatively coupling, through an intermediate range communications protocol, to the secondary device; and
activating, after communicatively coupling to the secondary device, the fob for at least the use with the user account.

3. The fob of claim 2, wherein prior to the periodically reconnecting, the operations further comprise:
receiving first authentication data via the authentication sensor; and
storing the first authentication data within the secure element.

4. The fob of claim 3, wherein prior to the periodically reconnecting, the operations further comprise:
determining a first transaction limit of the plurality of transactions limits associated with the first authentication data;

receiving second authentication data via the authentication sensor;
matching the second authentication data to the first authentication data;
authenticating the user in response to matching the second authentication data to the first authentication data; and
determining a second transaction limit of the plurality of transactions limits associated with the second authentication data that is different from the first transaction limit.

5. The fob of claim 2, wherein the operations further comprise:
receiving the electronic token from the secondary device; and
storing the electronic token.

6. The fob of claim 1, wherein determining the electronic token comprises generating the electronic token from token data associated with the plurality of electronic tokens.

7. The fob of claim 1, wherein determining the electronic token comprises accessing a pre-stored token from the plurality of electronic tokens and writing the electronic token with the transaction data to the pre-stored token.

8. The fob of claim 1, wherein the short range communications protocol has a range of two feet or less.

9. The fob of claim 1, wherein the operations further comprise:
detecting the secondary device associated with the user within a first distance to the fob; and
communicating an unlock instruction to the secondary device via the short range communications protocol.

10. The fob of claim 1, wherein the authentication sensor is a biometric sensor.

11. An electronic device comprising:
a device body having a front surface and at least one additional surface;
an input button disposed on the front surface of the device body;
a scrolling button disposed on the front surface of the device body;
a display disposed on the front surface of the device body;
an authentication sensor disposed on one of the at least one additional surface;
a secure element configured to store account information for a user account and a plurality of electronic tokens;
a non-transitory memory; and
one or more hardware processors coupled to the non-transitory memory and configured to read instructions from the non-transitory memory to cause the electronic device to perform operations comprising:
reconnecting with a secondary device of a user;
refreshing, during the reconnecting, the plurality of electronic tokens with a service provider via the secondary device;
receiving, with the input button, an indication to conduct a transaction with a merchant device from the user account of the user that is associated with the service provider, wherein the user account comprises a funding source utilizing a verification value for a use of the funding source with the transaction;
determining a plurality of transactions limits associated with the use of the funding source with the transaction using the electronic device based on a voice used during processing the transaction;
determining that the use of the funding source with the transaction requires an authentication using previously stored voice data of the user based on the plurality of transactions limits, wherein the previously stored voice data of the user is detected by the electronic device over a time period;
detecting a voice in a proximity to the electronic device;
authenticating the user for the electronic device using and the voice, wherein the authenticating is based on comparing the voice to the previously stored voice data of the user;
determining an amount for the use of the funding source for the transaction based on the plurality of transactions limits and the voice;
determining, via the secure element, an electronic token from the plurality of electronic tokens comprising transaction data based on the transaction, the user account, and the amount;
generating the verification value from a plurality of verification values associated with the funding source;
writing the verification value to the electronic token; and
communicating, through a short range communications protocol, the electronic token to the merchant device independent of any communications to the service provider.

12. The electronic device of claim 11, wherein the device body comprises a length of less than three inches.

13. The electronic device of claim 11, wherein the transaction comprises a payment transaction associated with the amount for the transaction data, and wherein the funding source comprises one of a debit card or a credit card.

14. The electronic device of claim 13, wherein the operations further comprise:
receiving data from a force sensor of the electronic device, wherein the authenticating the user is further based on the data, and wherein the communicating the electronic token is in response to authenticating the user.

15. The electronic device of claim 14, wherein authenticating the user comprises matching the data to stored authentication data associated with the user account.

16. An electronic fob comprising:
a device body having a front surface and a first surface;
an input button disposed on the device body;
a display disposed on the front surface of the device body;
an authentication sensor disposed on the first surface of the device body;
a plurality of scrolling buttons disposed on one of the front surface or the first surface of the body;
a secure element configured to store account information of a user account and a plurality of electronic tokens;
a non-transitory memory; and
one or more hardware processors coupled to the non-transitory memory and configured to read instructions from the non-transitory memory to cause the electronic fob to perform operations comprising:
reconnecting with a secondary device of a user;
refreshing, during the reconnecting, the plurality of electronic tokens with a payment provider via the secondary device;
receiving an indication to provide a payment to a merchant device from the user account of the user that is associated with the payment provider, wherein the user account comprises a funding source utilizing a verification value for a use of the funding source with the payment;

determining a plurality of transactions limits associated with the use of the funding source with the payment using the electronic fob based on a voice used during processing the payment;

determining that the use of the funding source with the payment requires an authentication using previously stored voice data of the user based on the plurality of transactions limits, wherein the previously stored voice data of the user is detected by the electronic fob over a time period;

detecting a voice in a proximity to the electronic fob using the authentication sensor;

authenticating the user for the electronic fob using the voice, wherein the authenticating is based on comparing the movement and the voice to the previously stored voice data of the user;

determining the payment for the use of the funding source based on the plurality of transactions limits and the voice;

determining, via the secure element, an electronic token from the plurality of electronic tokens comprising payment data based on the payment and the user account;

generating the verification value from a plurality of verification values associated with the funding source;

writing the verification value to the electronic token; and communicating, through a short range communications protocol, the electronic token to the merchant device independent of any communications to the payment provider.

17. The electronic fob of claim 16, wherein the display is a touchscreen display configured to receive a user input.

18. The electronic fob of claim 16, further comprising:
an input button disposed on a second surface of the device body, wherein the input button is configured to be pressed in three or more directions, and wherein two of the directions allow for scrolling of the display.

19. The electronic fob of claim 16, wherein the account information comprises funding source data for the funding source, and wherein the funding source comprises a payment card.

20. The electronic fob of claim 16, wherein the authentication sensor comprises an audio sensor and wherein the operations further comprise:
detecting a user voice, wherein the authenticating the user in response to detecting the user voice.

* * * * *